United States Patent
Foley et al.

(10) Patent No.: US 7,920,198 B2
(45) Date of Patent: Apr. 5, 2011

(54) METHODS AND APPARATUS FOR VARIABLE MODE DRIVERS

(75) Inventors: David P. Foley, Chelmsford, MA (US); Eitake Ibaragi, Kawaguchi (JP)

(73) Assignee: Analog Devices, Inc., Norwood, MA (US)

( * ) Notice: Subject to any disclaimer, the term of this patent is extended or adjusted under 35 U.S.C. 154(b) by 412 days.

(21) Appl. No.: 12/184,687

(22) Filed: Aug. 1, 2008

(65) Prior Publication Data
US 2009/0073299 A1 Mar. 19, 2009

Related U.S. Application Data

(60) Provisional application No. 60/962,936, filed on Aug. 1, 2007.

(51) Int. Cl.
| | |
|---|---|
| H04N 5/335 | (2011.01) |
| H04N 5/217 | (2011.01) |
| H01L 29/66 | (2006.01) |
| H01L 27/148 | (2006.01) |
| H01L 21/02 | (2006.01) |

(52) U.S. Cl. ........ 348/312; 348/311; 348/302; 348/294; 348/241; 257/183.1; 257/215; 257/242

(58) Field of Classification Search .......... 348/294–324, 348/248, 249, 241; 257/59, 72, 183.1, 215, 257/242, 258, 291, 443
See application file for complete search history.

(56) References Cited

U.S. PATENT DOCUMENTS

| 7,652,696 B2 * | 1/2010 | Hagiwara et al. | 348/241 |
| 7,817,200 B2 * | 10/2010 | Hirota | 348/313 |
| 2002/0154236 A1 * | 10/2002 | Sakurai et al. | 348/312 |
| 2006/0227234 A1 * | 10/2006 | Fereyre et al. | 348/312 |

FOREIGN PATENT DOCUMENTS

JP 06 121235 A 4/2004

OTHER PUBLICATIONS

International Search Report and Written Opinion for International Application No. PCT/US2008/009280 mailed Oct. 15, 2008.
International Preliminary Report on Patentability dated Feb. 11, 2010 in International Application No. PCT/US2008/009280.

* cited by examiner

*Primary Examiner* — Lin Ye
*Assistant Examiner* — Marly Camargo
(74) *Attorney, Agent, or Firm* — Knobbes Martens Olson & Bear LLP

(57) ABSTRACT

A method of transferring charge from a photosensitive array using a plurality of vertical shift registers, each having a plurality of vertical elements including first and last vertical element is disclosed The vertical shift registers are capable of transferring charge in a first direction from the first to the last vertical element The method also includes using at least one horizontal shift register having a plurality of horizontal elements. Each of the horizontal elements is arranged to receive charge transferred from the last vertical element of a respective one of the plurality of vertical shift registers, and shift the charge in a horizontal direction. The method includes operating the horizontal shift register during a plurality of horizontal operating intervals and operating the plurality of vertical shift registers during at least a portion of the plurality of horizontal operating intervals.

27 Claims, 9 Drawing Sheets

METHODS AND APPARATUS FOR VARIABLE MODE DRIVERS

RELATED APPLICATIONS

This application claims priority under 35 U.S.C. §119(e) to U.S. Provisional Application Ser. No. 60/962,936 entitled "VARIABLE DRIVE STRENGTH VERTICAL DRIVER FOR CHARGE-COUPLED DEVICES," filed on Aug. 1, 2007, which is herein incorporated by reference in its entirety.

BACKGROUND

Many digital cameras operate using an array of photosensitive elements, such as photodiodes, that generate an electrical signal in response to photons impinging on the sensitive surface of the photodiode. Charge-coupled devices (CCDs) may be coupled to the photosensitive elements to transfer the electrical signals (e.g., charge) from the photosensitive array. In the context of image acquisition, CCDs form and operate as shift registers capable of passing along charge to neighboring CCDs. To transfer the charge stored by the photodiode array, CCDs may be arranged to transfer charge vertically through vertical shift registers and horizontally through a horizontal shift register to serialize the charges stored by the array.

FIG. 1 illustrates a conventional method of transferring charges stored by a photosensitive array. Array 100 may be an array of photosensitive elements, such as photo-diodes, arranged in horizontal rows (e.g., rows A-J) and vertical columns (e.g., columns 1-10). Vertical CCDs are arranged to transfer charge from the photosensitive array into vertical shift registers that shift charge vertically (e.g., in a direction from row A to row J). A horizontal shift register 120 may be arranged to transfer charge horizontally (e.g., in a direction from column 1 to column 10). Thus, on each shift of the horizontal shift register 120, the charge currently stored at the last element of the register (e.g., at the J10 side of the horizontal register) is transferred out of the register and ultimately stored as a digital pixel value. The charge is typically converted into a voltage signal, amplified and sampled to obtain digitized values for the stored charge. As a result, the charges stored on the array are serialized into a time-varying voltage signal which may be digitized and stored as a digital image.

To avoid overwriting charges stored in the horizontal shift register, the horizontal shift register may need to be operated at a higher frequency. For example, all the charges in horizontal shift register may need to be transferred out before the vertical shift registers shift their respective last element charges into the horizontal shift register. Accordingly, in FIG. 1, the horizontal shift register must shift ten times for each vertical shift of charges. As a result, the horizontal clock may be operated at a much higher frequency than the vertical clock in order to properly transfer all of the charge off the array.

It should be appreciated that array 100 is exemplary and used merely to illustrate one method by which charges are transferred off an array of photosensitive elements. Typical photosensitive arrays will be much larger, as will be understood by those of ordinary skill in the art. In addition, the method described above is simplified to illustrate schematically how charges may be transferred from the photosensitive array. The terms vertical and horizontal are used arbitrarily to denote any two directions used to serialize two-dimensional data (e.g., a two-dimensional array of charges). However, charge may be transferred horizontally and then vertically as well.

Moreover, the use of the terms vertical and horizontal are used to be consistent with the terminology used in the art to describe the "direction" of charge transfer. In practice, charge transfer may not occur vertically and horizontally. For example, charge may be transferred down into the semiconductor device via shift registers and then transferred through another shift register to be serialized. Accordingly, the term vertical refers herein to a first direction of charge transfer and horizontal refers herein to a second direction of charge transfer. The terms vertical shift register and horizontal shift register are used herein to distinguish between separate shift registers and do not otherwise limit the nature of the shift registers, or elements of the shift register.

SUMMARY OF THE INVENTION

Some embodiments include a method of transferring charge from a photosensitive array using a plurality of vertical shift registers each having a plurality of vertical elements including a first vertical element and a last vertical element, each of the plurality of vertical elements capable of storing charge, the plurality of vertical shift registers, when operated, are capable of transferring charge from each of the plurality of vertical elements to a respective adjacent one of the plurality of vertical elements in a first direction from the first vertical element to the last vertical element, and using at least one horizontal shift register having a plurality of horizontal elements, each of the plurality of horizontal elements of the at least one horizontal shift register arranged to receive charge transferred from the last vertical element of a respective one of the plurality of vertical shift registers, the at least one horizontal shift register, when operated, capable of transferring charge from each of the plurality of horizontal elements to a respective adjacent one of the plurality of horizontal elements, the method comprising operating the at least one horizontal shift register during a plurality of horizontal operating intervals, and operating the plurality of vertical shift registers during at least a portion of the plurality of horizontal operating intervals.

Some embodiments include a circuit for transferring charge from a photosensitive array, the circuit comprising a plurality of vertical shift registers, each of the plurality of vertical shift registers including a plurality of vertical elements including a first vertical element and a last vertical element, each of the plurality of vertical elements capable of storing charge, wherein each of the plurality of vertical shift registers, when operated, is capable of transferring charge from each of the plurality of vertical elements to a respective adjacent one of the plurality of vertical elements in a direction from the respective first vertical element to the respective last vertical element, at least one horizontal shift register having a plurality of horizontal elements each capable of storing charge, the at least one horizontal shift register arranged to receive charge transferred out of the plurality of vertical shift registers by arranging each of the plurality of horizontal elements of the at least one horizontal shift register to receive charge from a respective last vertical element of the plurality of vertical shift registers, wherein the at least one horizontal shift register, when operated, is capable of transferring charge from each of the plurality of horizontal elements to a respective adjacent one of the plurality of horizontal elements, and at least one controller configured to control timing of operating the plurality of vertical shift registers and the at least one horizontal shift register, wherein the at least one controller is configured to operate the at least one horizontal shift register during a plurality of horizontal operating intervals, the at least one controller further configured to operate the plurality of vertical shift registers during at least a portion of each of the plurality of horizontal operating intervals.

DETAILED DESCRIPTION

Figure 1:
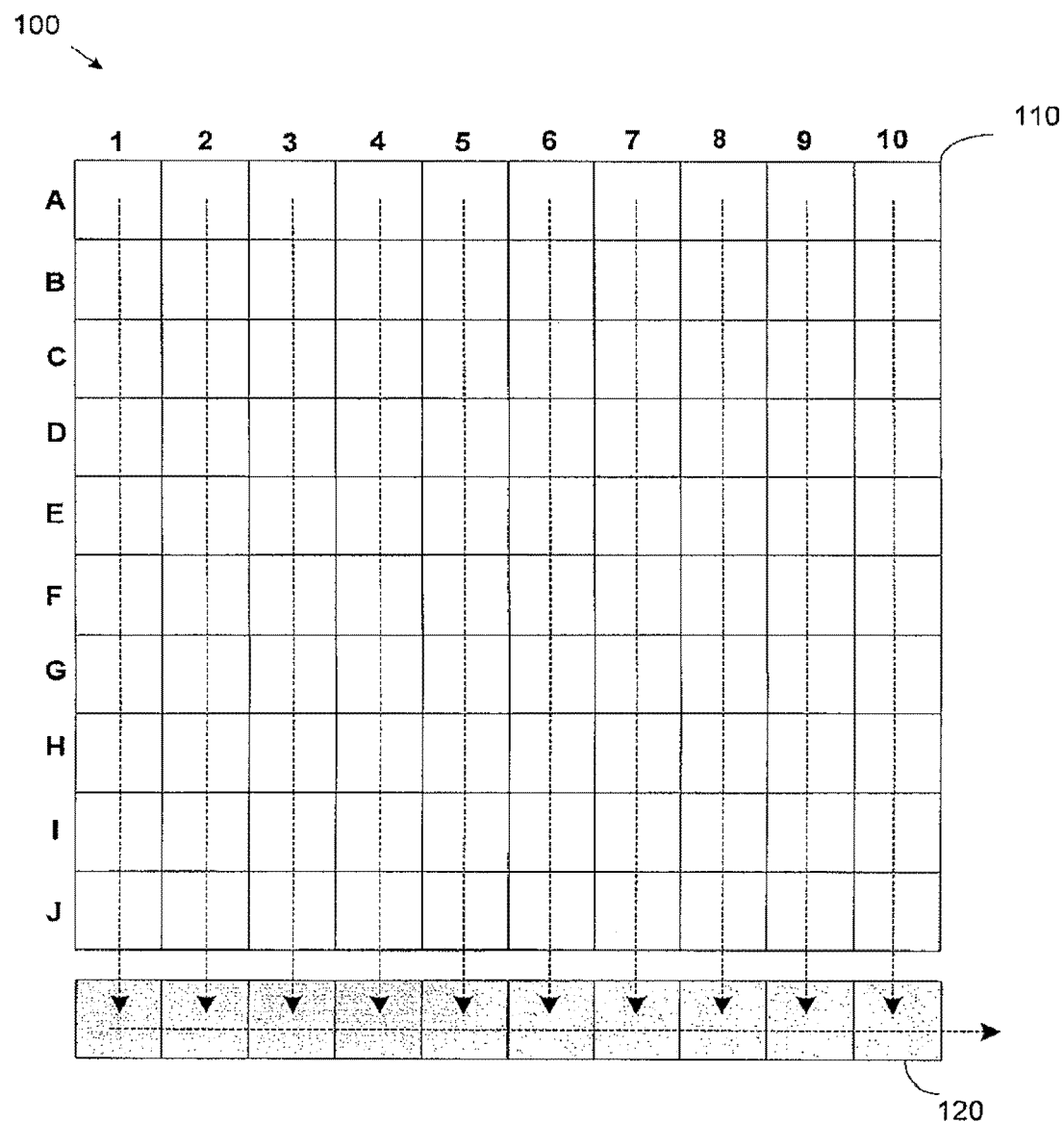
FIG. 1 illustrates a conventional method of transferring charges stored by a photosensitive array.

As image resolution increases for digital cameras, the size of the photosensitive arrays also increases. An effect of increased array sizes includes increased times to transfer all the charge off of the array (i.e., image acquisition time increases). Thus, capturing high resolution video may be limited by how quickly charge can be transferred off of the array so that the array can capture subsequent data (e.g., so that the next frame in the video may be acquired). Conventional solutions have included increasing the clock frequencies of the vertical and horizontal shift registers. However, increasing the clock frequency has limits as well.

As discussed above, signal charges are transferred vertically and then horizontally to serialize the data obtained by the photosensitive array. The horizontal shift register (e.g., horizontal shift register 120 of FIG. 1), and more particularly, the components for converting the transferred charge to a serial analog signal as well as the analog signal itself may be relatively sensitive to noise coupling. In particular, activity of the vertical shift registers (e.g., vertical shift registers 110) may couple to the horizontal system to corrupt the analog signal, resulting in image artifacts in the digitized image. To avoid corrupting the image data, conventional vertical drivers (V-drivers) operate the vertical shift registers only during a horizontal blanking period (HBLK) in which the horizontal shift register is not operational (also referred to herein as horizontal non-operating intervals). As a result, the serialized analog voltage signal during the horizontal blanking period does not carry image information. Similarly, when the horizontal shift register is operating, the V-drivers do not operate the vertical shift registers.

Because the vertical and horizontal clocks cannot be conventionally operated simultaneously without substantially corrupting the image data, additional time is required to fully transfer charge from a photosensitive array (e.g., to transfer and digitize a frame of video). As a result, video must often be obtained at lower resolution to avoid corrupting the data. For example, a limited number of pixels can be transferred at 30 frames per second due, at least in part, to the fact that operation of the vertical and horizontal shift registers is alternated to avoid corrupting the image data. Applicant has appreciated that higher resolution images may be obtained at video frame rates if the vertical shift registers could be operated, at least to some extent, concurrently with the horizontal shift register.

In some embodiments, a V-drivers are provided that may be operated while the horizontal shift register is in operation. In some embodiments, the V-driver includes an adjustable drive strength and/or an adjustable turn-on time for drive switches of the V-driver to facilitate reducing noise coupling to an acceptable level. In some embodiments, the adjustable drive strength and/or adjustable turn-on time may be digitally programmable. In some embodiments, the adjustable drive strength and/or adjustable turn-on time may be substantially continuously adjustable. In some embodiments, any one or combination of the above features may be provided.

Following below are more detailed descriptions of various concepts related to, and embodiments of, methods and apparatus according to the present invention. It should be appreciated that various aspects of the invention described herein may be implemented in any of numerous ways. Examples of specific implementations are provided herein for illustrative purposes only. In addition, the various aspects of the invention described in the embodiments below may be used alone or in any combination, and are not limited to the combinations explicitly described herein.

Figure 2:
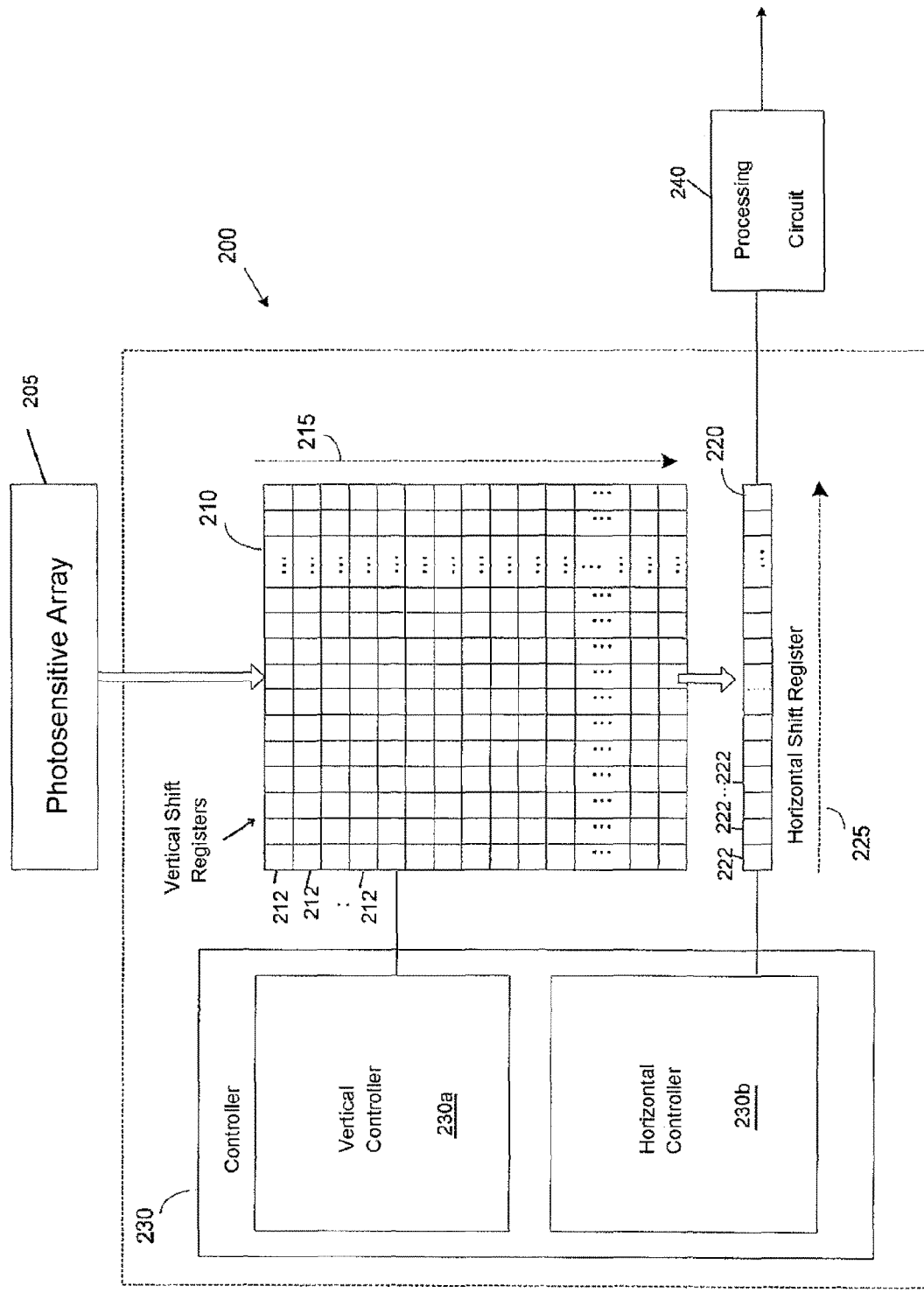
FIG. 2 illustrates a circuit capable of transferring charge from a photosensitive array.

FIG. 2 illustrates a circuit capable of transferring charge from a photosensitive array 205. Circuit 200 may include a plurality of vertical shift registers 210, coupled to photosensitive array 205, and at least one horizontal shift register 220. Each of the plurality of vertical shift registers 210 includes a plurality vertical elements 212, each capable of storing charge (e.g., a CCD). When operated, each of vertical elements transfers charge to an adjacent vertical element in the respective vertical shift register in a direction indicated by arrow 215. The plurality of vertical shift registers may be of any size including any number of vertical elements suitable for obtaining and transferring charge off of photosensitive array 205.

Circuit 200 also includes a horizontal shift register 220 having a plurality of horizontal elements 222 capable of storing charge (e.g., a CCD). Horizontal shift register 220 is arranged such that charge transferred out of the last vertical element in each of the plurality of vertical shift registers is stored in a respective horizontal element of the horizontal shift register 220. When operated, the horizontal shift register transfers charge stored at each horizontal element to an adjacent horizontal element in the horizontal shift register in a direction denoted by arrow 225. The charge transferred out of horizontal shift register 220 may be further processed by processing circuit 240. For example, processing circuit 240 may convert the charge to a voltage signal that may be amplified and sampled to form a digitized representation of the charge transferred out of the photosensitive array (e.g., to form an image).

It should be appreciated that the vertical shift registers and the horizontal shift registers may be of any number and include any number of elements. For example, the number of vertical shift registers and the number of vertical elements in each shift register may be chosen to accommodate the size of photosensitive array 205, such that the charge stored in the photosensitive array can be transferred out of the array and serialized. Similarly, the number of horizontal elements may be chosen such that a horizontal element exists for each of the vertical shift registers in a particular design. In this way, the horizontal shift register can store each charge transferred out the last vertical element in each of the plurality of vertical shift registers, so that the charge can be serialized when the horizontal shift register is operated.

Circuit 200 also may include controller 230 that controls the timing of the operation of the vertical and horizontal shift registers. As discussed above, the vertical and horizontal shift registers are conventionally operated in temporal isolation of one another. That is, when the horizontal shift register 220 is being operated to serialize the charge, the vertical shift registers are not operated to avoid coupling noise generated by the operating of the vertical shift elements to the charge stored and/or being transferred from the horizontal shift register and digitized. Accordingly, controller 230 may include various components that can selectively operate the shift registers according to a desired timing schedule.

Controller 230 may include a vertical controller 230a and a horizontal controller 230b, each which respectively operate the vertical and horizontal shift registers. The various controllers may include any number of components that facilitate operation of the shift registers such as drivers, one or more clock signals and/or other logic or circuits that assist in operating the shift registers to appropriately transfer charge according to a desired timing schedule. As discussed above, Applicant has appreciated that the speed at which charge may be transferred off of a photosensitive array may be increased by operating the vertical and horizontal shift registers simultaneously for at least some duration. Accordingly, in some embodiments, controller 230 may be configured to operate the horizontal shift register during a plurality of horizontal operating intervals and operate the vertical shift registers during at least a portion of the plurality of horizontal operating intervals, as discussed in further detail below.

As discussed above, the use of the words vertical and horizontal are used herein for convenience to distinguish between the shift registers that transfer charge off the photosensitive array (e.g., vertical shift registers) and shift registers that serialize the charge received from registers obtaining charge from the photosensitive array. The terms vertical and horizontal were chosen as they are terms familiar with practitioners in the art. However, the terms do not denote any particular direction of charge transfer or limit the shift registers in any way. The terms are merely used as convenient differentiators.

Figure 3:
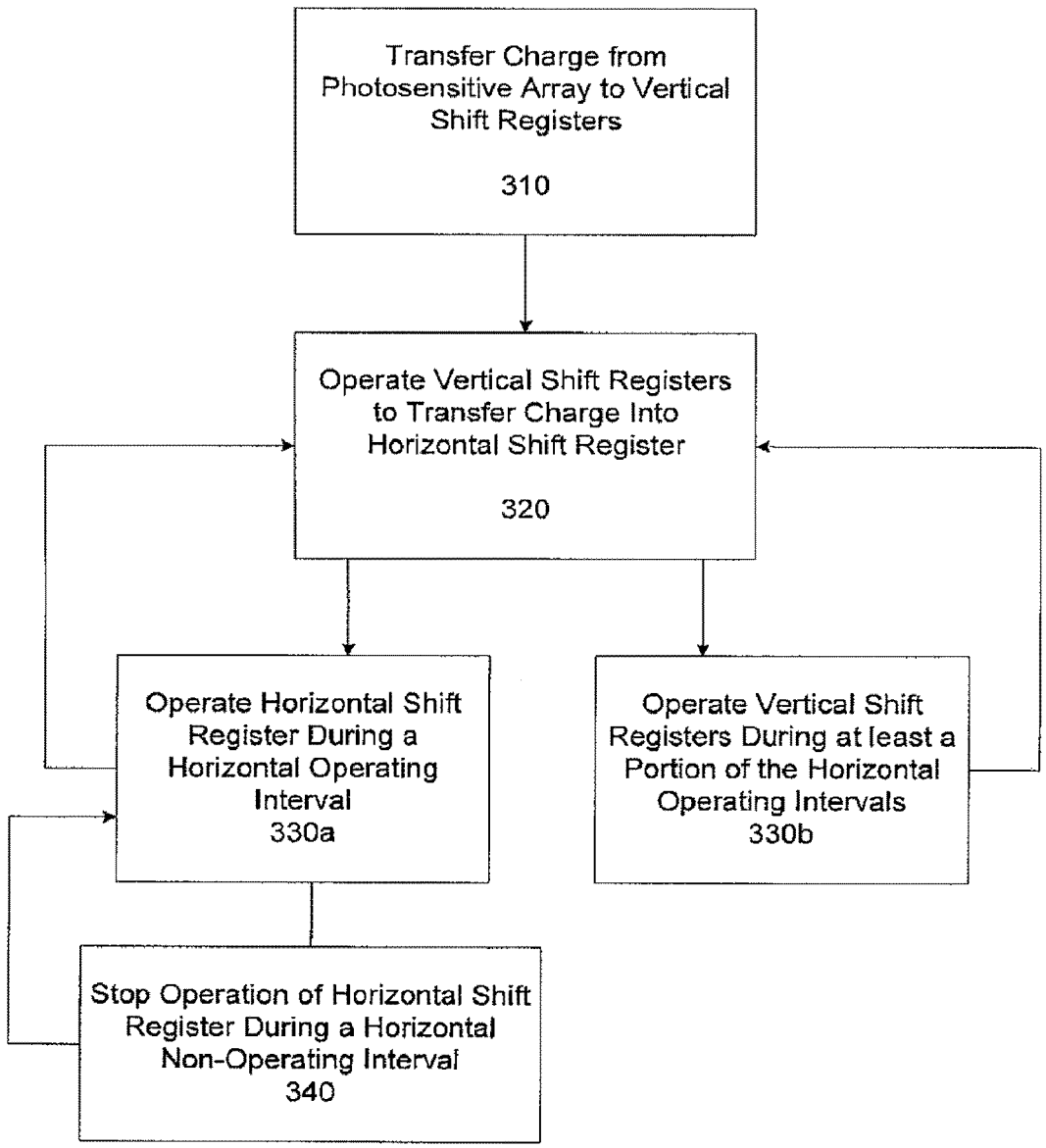
FIG. 3 illustrates a method of transferring charges stored by a photosensitive array, in accordance with some embodiments of the present invention.

FIG. 3 illustrates a method of transferring charge from a photosensitive array, in accordance with some embodiments of the present invention. In act 310, vertical shift registers are operated to obtain charge stored in a photosensitive array. For example, a photo may have been taken, or a frame of video obtained for which digitization is desired. In act 320, the vertical shift registers are operated so that at least some of the charge obtained from the photosensitive array is transferred into a horizontal shift register, for example, to be serialized, digitized and stored as an image. In act 330a, the horizontal shift register is operated during a horizontal operating interval. For example, the horizontal operating interval may be of a duration (e.g., a sufficient number of clock cycles) to transfer all of the charge obtained from the vertical shift registers out of the horizontal shift register. However, the horizontal operating interval may be of any desired duration. After the horizontal operating interval expires, operation of the horizontal shift register may be stopped during a horizontal non-operating interval (act 340).

In act 330b, the vertical shift registers are operated during at least a portion of the horizontal operating interval. For example, the vertical shift registers may be operated in a low power mode that begins advancing the next row of charge stored in the last vertical elements of the vertical shift registers into the horizontal shift registers. The low power mode may be performed at a power level sufficient to operate the vertical shift registers without significant noise coupling with the horizontal shift register, as discussed in further detail below.

After the horizontal operating interval has completed, operation of the horizontal shift register is stopped (act 340). Meanwhile the vertical shift registers are operated to complete the transfer of the next row of charge into the horizontal shift register. That is, after the horizontal operating interval completes, act 320 may be repeated. As shown, act 330b is also followed by repeating act 320. For example, during at least a portion of the horizontal operating interval, the vertical shift registers may be operated in a low power mode. After the horizontal operating interval has completed, the vertical shift registers may be operated in a high power mode to complete the transfer of charge into the horizontal shift register during the horizontal non-operating interval. In some embodiments, the vertical shift register is operated in the low power mode substantially throughout the horizontal operating interval and operated in the high power mode substantially throughout the horizontal non-operating interval. However, the vertical shift register may be operated for any desired portion of the horizontal operating interval, as the aspects of the invention are not limited in this respect.

The terms low power mode and high power mode are used to signify generally relative power requirements. That is, the use of the term low power denotes that the power requirements are lower than the high power mode. Similarly, the high power mode denotes only that the power requirements are higher than required by the low power mode. Aspects of the invention are not limited for use with any particular power requirements. The different power modes may be characterized by any number of different generally low power features including operation of smaller switches having lower gate voltage thresholds and/or slower turn-on times, or other generally low voltage operations that may decrease noise coupling between the vertical and horizontal systems.

Figure 4:
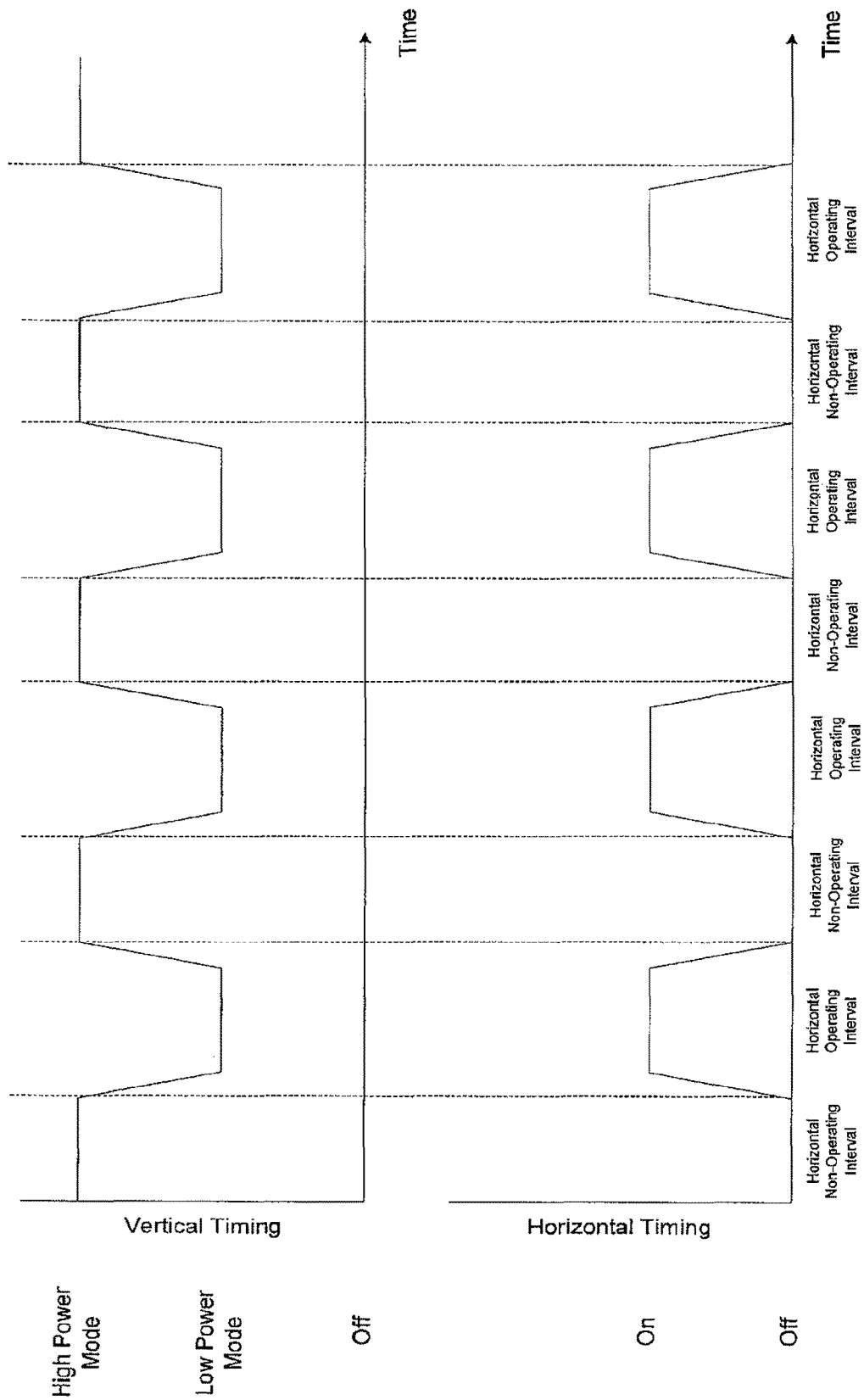
FIG. 4 illustrates a timing diagram for operating the vertical and horizontal shift registers in accordance with some embodiments of the present invention.

FIG. 4 illustrates a timing diagram for operating the vertical and horizontal shift registers in accordance with some embodiments of the present invention. As shown, the horizontal shift register is alternately operated during the horizontal operating intervals and stopped during the horizontal non-operating intervals. During the horizontal operating intervals, the vertical shift registers may be operating in a low power mode and during the horizontal non-operating intervals, the vertical shift registers may be operated in a high power mode. While the vertical shift registers are illustrated as operated in the low power mode substantially throughout the horizontal non-operating intervals, the vertical shift registers may be operated during any portion of the horizontal non-operating intervals, as the aspects of the invention are not limited in this respect.

Because the vertical shift registers are operating in a low power mode for at least a portion of the horizontal non-operating intervals, the charge stored in the vertical registers may begin to be advanced during the horizontal operating intervals without completely transferring the charge. Accordingly, when the horizontal operating interval ends and the horizontal shift register is stopped, the vertical shift register can be operated in the high power mode. Because the charge transfer has been partially completed, less time is required to complete the charge transfer. That is, the duration of the horizontal non-operational interval may be shortened, thus decreasing the amount of time require to transfer and serialize all of the charge obtained from the photosensitive array.

Figure 5:
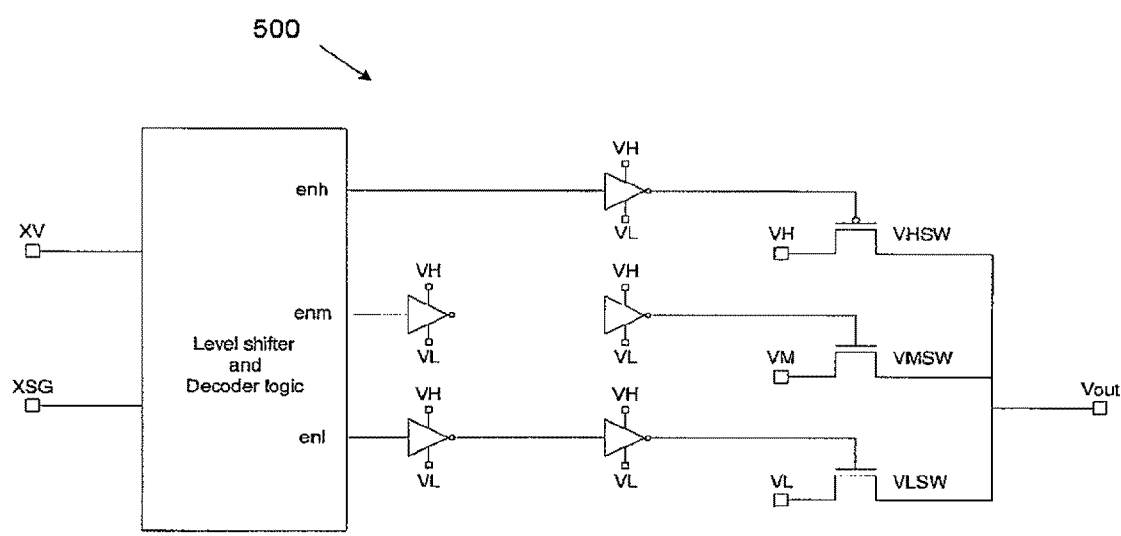
FIG. 5 illustrates a conventional V-driver element for driving a vertical shift register to transfer charge.

FIG. 5 illustrates a conventional V-driver element for driving a vertical shift register to transfer charge. For example, controller 230a in FIG. 2 may include a V-driver element to drive each of the vertical elements of the vertical shift registers so that charge may be transferred to adjacent elements when the vertical shift register is operated. Accordingly, numerous V-driver elements may be implemented to assist in the charge transfer that occurs when the vertical shift registers are operated.

Charge is typically transferred through a shift register by applying either an attracting potential (e.g., a positive potential) to pull charge, or applying a repelling potential (e.g., a negative potential) to push charge in a desired direction. Thus, conventional V-drivers include elements capable of providing either a positive, negative or substantially zero (e.g., ground) potential to facilitate transferring charge. Vertical drive element 500 includes a high voltage source VH, a low voltage source VL, and a potential near ground VM. VH operates as an attracting potential that, in many conventional V-drivers, may be approximately 16 volts. VL operates as a repelling potential, and in many conventional V-drivers, may be approximately −8 volts. VM operates as a near ground potential for the high and low voltages.

Vertical drive element 500 also includes a level shifter and decoder logic having two inputs XV and XSG, which select which of the outputs enh, enm and enl will be enabled. The outputs are connected, via buffers, to the gates of transistors VHSW, VMSW and VLSW, respectively, which operate as switches Accordingly, when the logic combination of XV and XSG selects enh, the level shifter provides the appropriate logic level at output enh and the high attracting voltage VH is provided at Vout. When the logic combination of XV and XSG selects enm, the ground potential VM is provided at Vout, and when the logic combination of XV and XSG selects enl, the level shifter provides the appropriate logic level at enl and the negative repelling voltage VL is provided at Vout. Conventional V-drivers include sequencers to apply the appropriate XV and XSG signals to the driver elements to transfer charges out of the photosensitive array and through the vertical shift registers.

In conventional V-drivers, VH is applied to pull charge out of the photosensitive array and into the vertical shift registers, and VL is applied to transfer the charge through the vertical shift register. That is, charge is attracted from the photosensitive array and alternately repelled and attracted through the shift registers. Thus, VH may be selected only once per frame, while VM and VL may be selected for alternating sides of the elements of the vertical shift registers on each transfer of charge from one element of the vertical shift register to the adjacent element. Each switch (implemented as a transistor) has an on-resistance that depends on it's size and it's gate voltage. Thus, the on-resistance and therefore drive strength assumes a fixed value whenever the respective switch is turned on. The operation of the switches in the V-driver causes noise that tends to couple to the horizontal system if operated simultaneously, resulting in substantial corruption of the image data.

Figure 6:
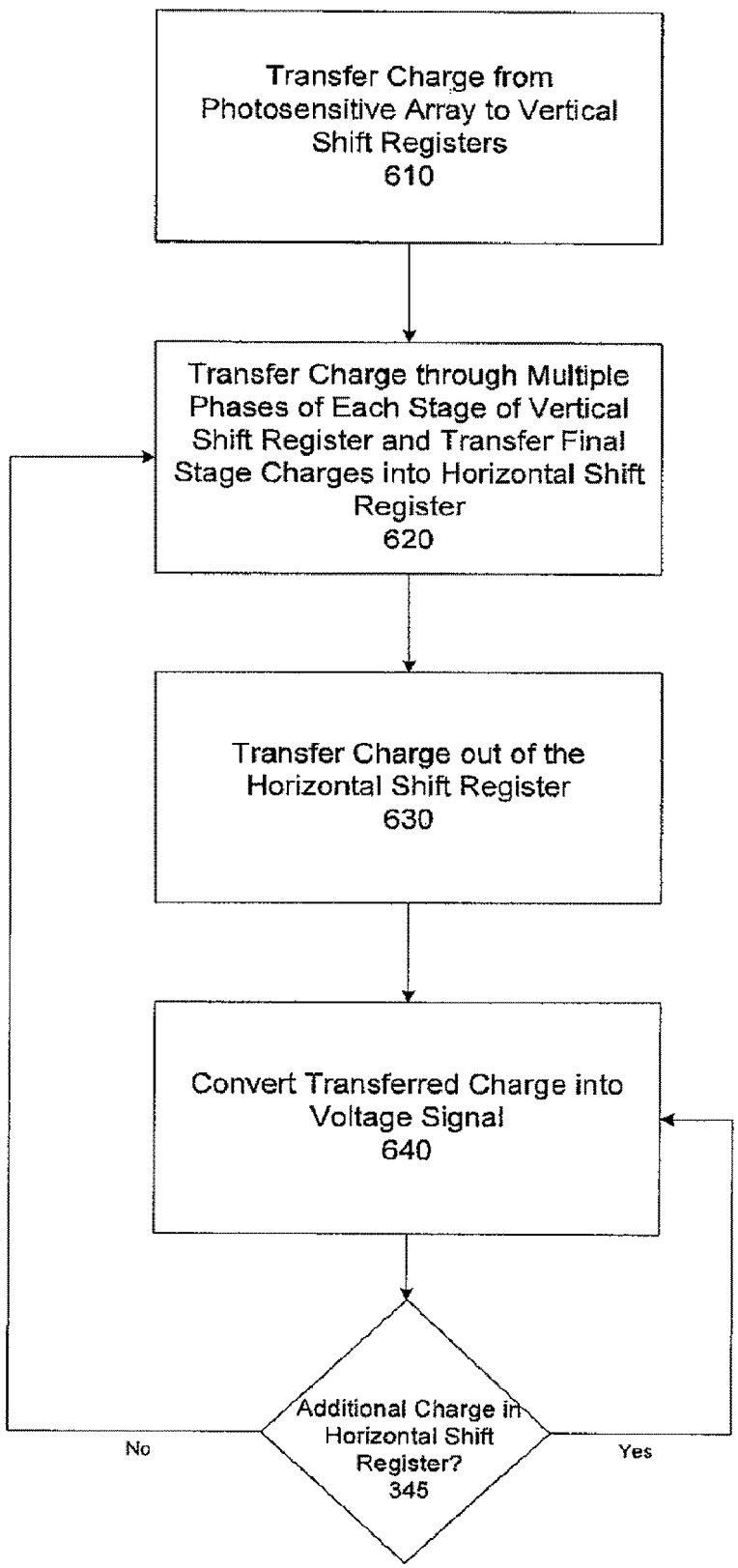
FIG. 6 illustrates a method for serializing image data from a two-dimensional photosensitive array.

As discussed above, the method of transferring charge from a photosensitive array into a serialized analog signal may include complexity not illustrated in FIG. 1. In particular, charge is typically transferred from one element of a vertical shift register in multiple phases rather than on a single clock pulse. For example, a vertical shift register typically comprises N elements defining the length of the shift register, each of the N elements may have multiple phases to transfer charge to the next element. Conventional V-drivers may transfer charge from one element to the next in up to six or more phases to correctly transfer the charge through the underlying semiconductor structure comprising a single element of the vertical shift register. Accordingly, FIG. 6 illustrates a method for serializing image data from a two-dimensional photosensitive array.

In act 610, charge is transferred from the photosensitive array into the vertical shift registers. For example, the select inputs of the V-driver elements (e.g., XV and XSG) may be applied to select the VHSW switch to attract the charges and transfer them into the vertical shift registers. Consider the photosensitive array illustrated in FIG. 1 having ten rows and ten columns. Such an array may include ten vertical shift registers, each having ten elements that store a charge corresponding to one of the pixels in the photosensitive array. However, each element may be made up of numerous semiconductor structures that require multiple phases to move the charge to a neighboring element in the vertical shift register.

Act 620 comprises six steps which are needed to transfer charges through the six phases of each element in the vertical shift registers. Each element may require at least one clock cycle to progress to the next phase in the charge transfer. Thus, at least six clock cycles may be required to transfer charge vertically by one element. The last element in each vertical shift register is transferred into the horizontal shift register to be serialized as discussed above. After the charge has been transferred vertically by one element, the V-drivers cease operating the vertical shift register to avoid noise coupling with the horizontal system as the serialized image signal is generated.

In act 630, the horizontal clocking system begins to operate the horizontal shift register to transfer the charge out of the horizontal shift register to be serialized. As discussed above, horizontal shift registers are generally lower voltage shift registers than the vertical shift registers. In addition, horizontal shift registers are often comprised of two-phase elements rather than higher number elements (e.g., five, six, or more) used in vertical shift registers. In act 635, each charge transferred out of the horizontal shift register may be converted into a voltage signal that may be amplified and digitized to form digital image data from the charge stored in the horizontal shift register. This process may be repeated until all of the charge transferred into the horizontal shift register has been transferred out and converted into the time varying voltage signal representative of the charge distribution previously stored in the horizontal register. When the horizontal shift register is emptied, the process may be repeated at act 620. That is, the V-driver may activate the vertical shift registers to transfer charge vertically one element in the vertical shift registers, thereby transferring charge in the last element of the vertical registers into the horizontal shift register. This process may be repeated until all the charge has been serialized, digitized and stored as image data (e.g., acts 620-635 may be repeated until the image has been captured).

While the horizontal clocking system must serially transfer many times as many charges through the horizontal shift register as the vertical shift register on each iteration, the ability to clock the horizontal shift register at a much higher clock speed makes individual charge transfer substantially faster in the horizontal shift register. As a result, the interval in which the horizontal shift registers are operational is not proportionately longer (with respect to the number of charges transferred serially) than the interval in which the vertical shift registers are operational. This is due in part to the faster horizontal clocking speeds and due to the additional phases of each element in the vertical shift registers. As a result, transferring charges through the multiple phases of the vertical shift registers is a significant portion of each iteration of charge transfer and serialization.

As discussed above, noise coupling may conventionally compel alternating the operation of the vertical and horizontal shift registers. Thus, in order to transfer frames at video rates, the switches in the V-driver must be relatively large to achieve the necessary transfer rates, which in turn generates increased noise coupling. Applicant has appreciated that by operating the vertical shift registers at least partially during the interval in which the horizontal shift registers are operated, the time required to capture a frame may be reduced and higher resolution images may be captured at video frame rates. Applicant has recognized that by utilizing the interval in which the horizontal shift registers operate, the speed at which charge needs to be transferred through the multiple phases of a element of the vertical shift registers can be reduced, resulting in a corresponding reduction in the switch sizes needed to perform the charge transfer at the reduced rate. The reduction is switch size and transfer rates results in a reduction in noise coupling, which can be reduced to an acceptable level to speed up frame capture times.

Figure 7:
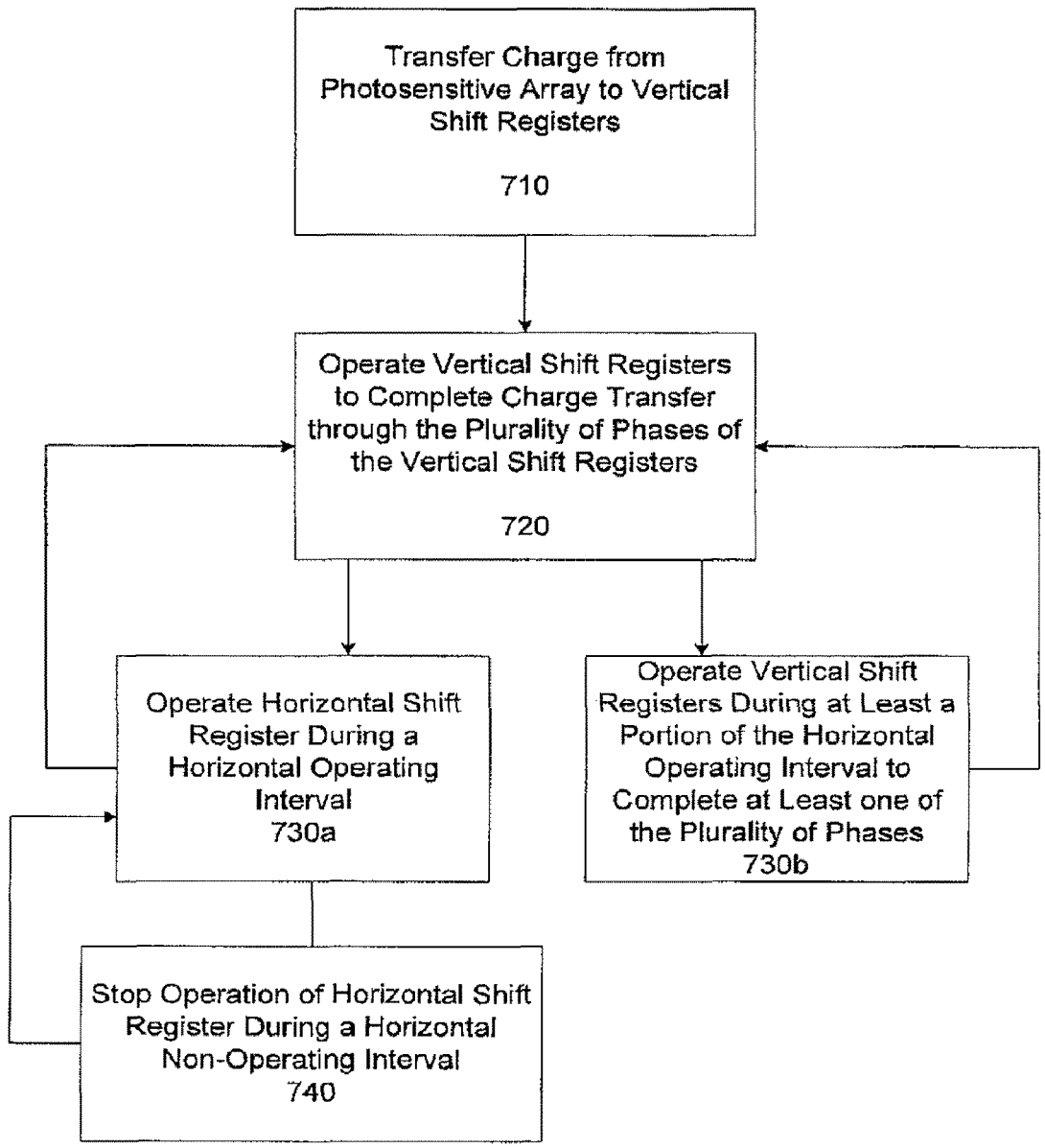
FIG. 7 illustrates a method of transferring charge from a photosensitive array, in accordance with some embodiments of the present invention.

FIG. 7 illustrates a method of transferring charge from a photosensitive array, in accordance with some embodiments of the present invention. In act 710, vertical shift registers are operated to obtain charge stored in a photosensitive array. For example, a photo may have been taken, or a frame of video obtained for which digitization is desired. In act 720, the vertical shift registers are operated so that at least some of the charge obtained from the photosensitive array is transferred into a horizontal shift register, for example, to be serialized, digitized and stored as an image data. As discussed above, complete charge transfer may include operating the vertical shift registers through a plurality of phases. When act 720 is repeated, the charge transfer through any remaining incomplete phases is completed such that target charge is fully transferred into the horizontal shift register.

In act 730*a*, the horizontal shift register is operated for a horizontal operating interval. For example, the horizontal operating interval may be of a duration (e.g., a sufficient number of clock cycles) to transfer all of the charge obtained from the vertical shift registers out of the horizontal shift register. However, the horizontal operating interval may be of any desired duration. After the horizontal operating interval expires, operation of the horizontal shift register may stop during a horizontal non-operating interval.

In act 730*b*, the vertical shift registers are operated during at least a portion of the horizontal operating interval. For example, the vertical shift registers may be operated in a low power mode that begins advancing the next row of charge stored in the last vertical element of the vertical shift registers into the horizontal shift registers. The low power mode may be performed at a power level sufficient to operate the vertical shift registers without significant noise coupling with the horizontal shift register. For example, the vertical shift registers may be operated in the low power mode to complete one or more of the plurality of phases required to fully transfer charge into the next vertical element and/or the appropriate horizontal element in the case of the last vertical element of each vertical shift register.

After the horizontal operating interval has completed, operation of the horizontal shift register is stopped (act 740). Meanwhile the vertical shift registers are operated to complete the charge transfer to vertical elements and complete charge transfer into the horizontal shift register. That is, after the horizontal operating interval completes, act 720 may be repeated. As discussed above, repeated acts 720 may complete any phases that were not completed when the vertical shift registers were operating during the horizontal operating interval.

As shown, act 730*b* is also followed by repeating act 720. For example, during at least a portion of the horizontal operating interval, the vertical shift registers may be operated in a low power mode. After the horizontal operating interval has completed, the vertical shift registers may be operated in a high power mode to complete the transfer of charge into the horizontal shift register during the horizontal non-operating interval. In some embodiments, the vertical shift register is operated in the low power mode substantially throughout the horizontal operating mode and operated in the high power mode substantially throughout the horizontal non-operating interval. However, the vertical shift register may be operated for any desired portion of the horizontal operating interval.

As should be appreciated, because at least some of the phases required to complete charge transfer are performed during at least a portion of the horizontal operating interval, less time is required to complete the charge transfer after the horizontal shift register has emptied the register of charge and operation has stopped. That is, the horizontal non-operating intervals (wherein the vertical shift registers may be operated in the high power mode) may be shortened and the time required to fully remove and serialize charge may be reduced.

Figure 8:
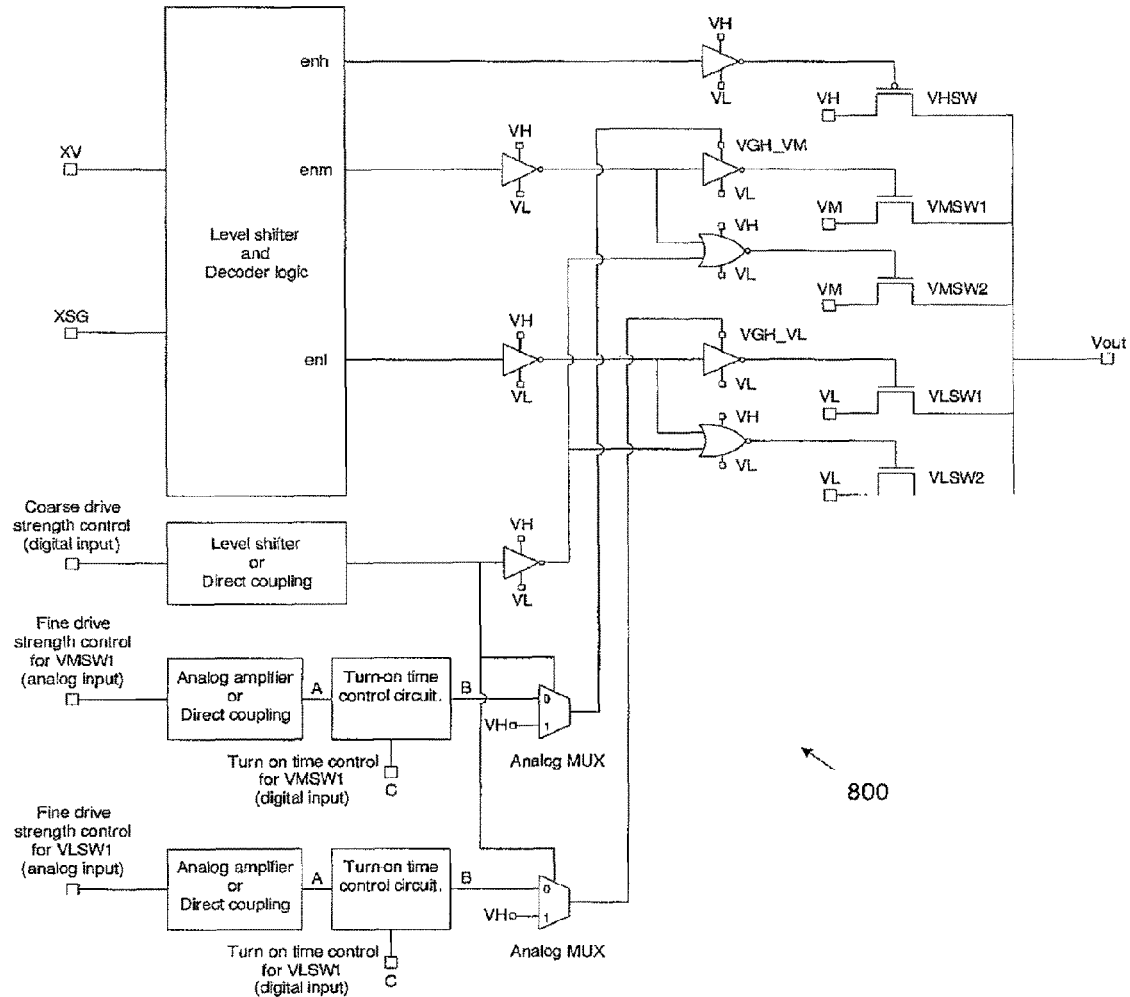
FIG. 8 illustrates a V-driver element adapted to operate at least partially during the time the horizontal shift register is operating, in accordance with some embodiments of the present invention.

FIG. 8 illustrates a V-driver element adapted to operate at least partially during the time the horizontal shift register is operating (e.g., during horizontal operating intervals), in accordance with some embodiments of the present invention. V-driver element 800 is configured to deliver a reduced noise switch element to transfer charges vertically simultaneous with operation of the horizontal clocking system (e.g., while image data is being clocked out of the array) without incurring substantial corruption of the image data. In some embodiments, a drive strength for the reduced noise switch is selected during operation of the horizontal clocking system that is high enough to insure adequate charge transfer efficiency through the vertical shift registers and low enough to prevent substantial noise coupling from the V-driver to the image data.

V-driver element 800 may be similar to V-driver element 500 to the extent that it includes a switch (VHSW) for providing a high voltage source VH suitable for attracting charge from the photosensitive array, a switch VMSW1 for providing a near ground potential VM, a switch VLSW1 for providing a negative voltage for repelling charge through the vertical shift registers, and a level shifter and decoder logic for selecting and timing the appropriate switches. Accordingly, V-driver element 800 may be operated in the same way as conventional V-drivers. However, V-driver element 800 may also include additional circuitry that facilitates operating the V-driver during at least portions of intervals wherein the horizontal shift register is also operating.

To enable such capabilities, V-driver element 800 includes additional switches VMSW2 and VLSW2 and logic to provide the VM and VL at Vout via the additional switches, respectively. As discussed above, the amount of the noise coupling resulting from operating the switches is primarily linked to the size of the switch and the turn-on speed at which a switch is operated. As discussed above, Applicant has appreciated that when the intervals during which the horizontal shift register is operated are utilized by the vertical shift registers, the speed at which the switches are operated may be reduced while still achieving an overall speed-up in frame capture. That is, while charge is being transferred out of the horizontal shift register, the V-drivers may be operated to transfer charges through multiple phases of each element of the vertical shift registers. When the horizontal shift register has been emptied, charge in the vertical shift registers has already been partially, substantially or completely transferred through the multiple phases of the vertical shift registers and can be transferred to the next element and into the horizontal shift register in less time than if the vertical shift registers remained non-operational while the horizontal shift register was being operated.

VMSW2, therefore, is implemented with a switch significantly smaller than VMSW1. Similarly, VLSW2 is implemented with a switch significantly smaller than VLSW1. In some embodiments, VMSW2 and VLSW2 are approximately one tenth the size of VMSW1 and VMSW2, respectively. However, the size of VMSW2 and VLSW2 may be smaller than the respective counterpart switches by any amount, as the aspects of the invention are not limited in this respect. In addition, the size reduction selected for VMSW2 relative to VMSW1 need not be the same as the size reduction selected for VLSW2 relative to VLSW1. During at least part of the interval (and preferably the entire interval) that the horizontal shift register is operational, switches VMSW2 and VLSW2 are operated at a selected reduced speed to transfer charge through the phases of the vertical shift register, as discussed in further detail below.

V-driver element 800 may be capable of operating in two-modes; a course drive strength mode and a fine drive strength mode (e.g., these modes may correspond to low power and high power operating modes, respectively). When operating in the course drive strength mode, the V-driver may operate as a conventional V-driver (e.g., only operating the vertical shift register during HBLK periods or horizontal non-operating intervals). The course drive strength mode is activated by enabling the course drive strength control, which operates to enable the VMSW1, VMSW2, VLSW1 and VLSW2 switches in coordination with the XV and XSG select inputs. While the course drive strength mode of V-driver element 800 enables both the large and small switches (i.e., VMSW1 and VMSW2, or VLSW1 and VLSW2), this is not a limitation on the aspects of the invention. For example, the course drive strength mode may only enable the large switches (e.g., VMSW1 or VLSW1). However, it may be preferable to operate both large and small switches in the course driver strength mode to achieve charge transfer at the fastest speed possible given the available switches.

When operating in the fine drive strength mode, the V-driver may be operated simultaneously with the horizontal driver due to the reduced noise coupling of the smaller switches which may be operated at a slower rate. The fine drive strength mode is activated by enabling the fine drive strength control, which operates to enable the small switches (i.e., VMSW2 and VLSW2) in accordance with select inputs XV and XSG, and to disable the large switches (i.e., VMSW1 and VLSW1). Since only the small switches are enabled, the V-driver may operate at the same time as the horizontal shift register with acceptable levels of noise coupling. As discussed above, Applicant has appreciated that the amount of noise coupling is not only a function of switch size, but also a function of the drive speed (e.g., the turn-on time of the switches). V-driver element 800 includes turn-on time control circuits that allow the turn-on time of the switches to be adjusted to optimize the noise coupling versus charge transfer time achieved by the V-driver.

Figure 9:
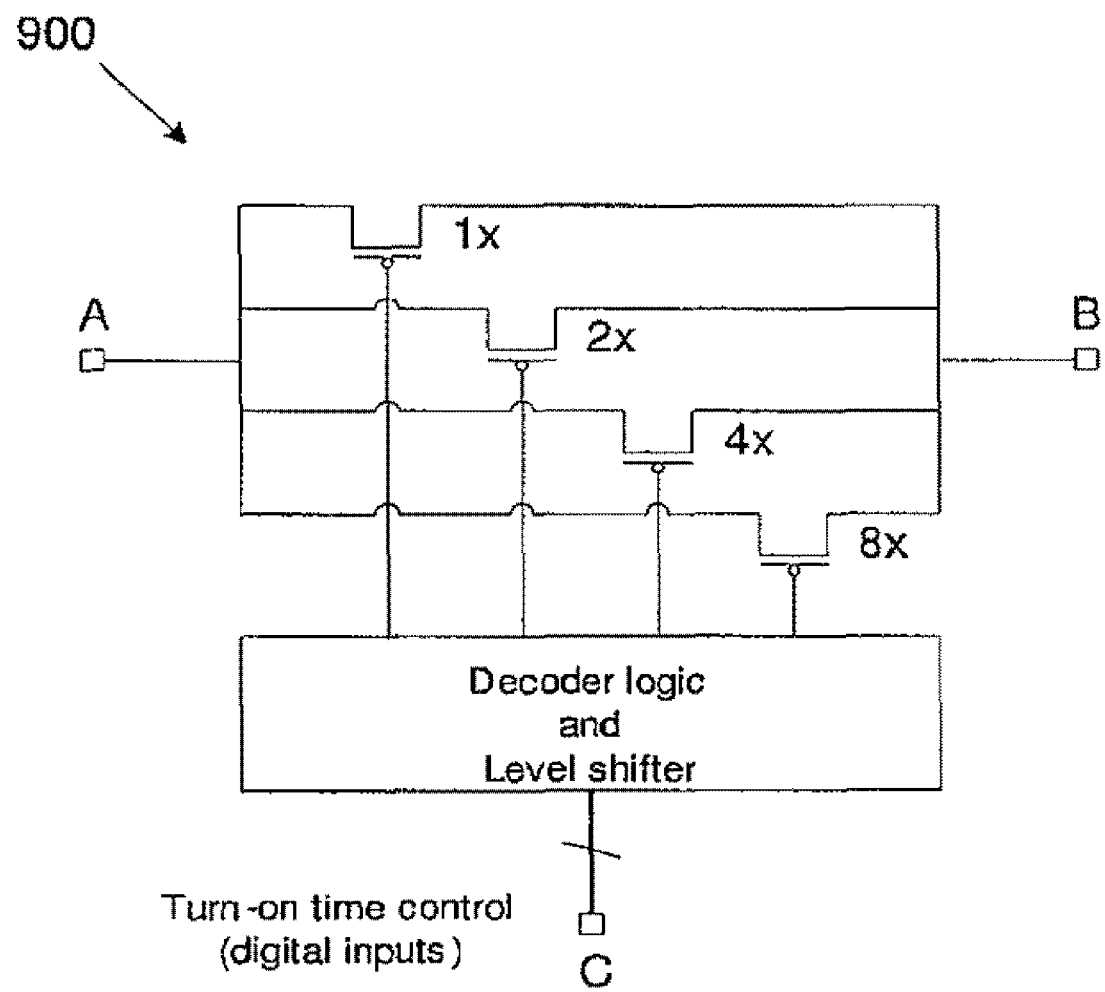
FIG. 9 illustrates a turn-on time control circuit that facilitates adjusting the turn-on time of the associated switches, in accordance with some embodiments of the present invention.

FIG. 9 illustrates a turn-on time control circuit that facilitates adjusting the turn-on time of the associated switches, in accordance with some embodiments of the present invention. Turn-on time control circuit 900 includes a plurality of resistances that can be selected to be connected in parallel between terminals A and B. The operation of the control circuit uses the principle that the higher the resistance, the longer the turn on time of the transistor (e.g., VMSW2 or VLSW2) whose gate is controlled via the turn-on time control circuit. Decoder logic and level shifter is connected to switches that can be turned on or off to connect and disconnect the various resistances in any combination. It should be appreciated that the various combinations of resistances available for selection can provide a substantially continuously adjustable turn-on time such that the noise coupling can be controlled to suit a particular image acquisition application. Thus, a V-driver according to some embodiments may include adjustable drive strength and adjustable turn-on time to achieve a V-driver that can be operated simultaneously with the horizontal shift register with noise coupling that can be adjusted to satisfy a given application.

The above-described embodiments of the present invention can be implemented in any of numerous ways. For example, the embodiments may be implemented using hardware, software or a combination thereof. It should be appreciated that any component or collection of components that perform the functions described above can be generically considered as one or more controllers that control the above-discussed function. The one or more controller can be implemented in numerous ways, such as with dedicated hardware, or with general purpose hardware (e.g., one or more processor) that is programmed using microcode or software to perform the functions recited above.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. The invention is capable of other embodiments and of being practiced or of being carried out in various ways. Accordingly, the foregoing description and drawings are by way of example only.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," containing, "involving", and variations thereof herein, is meant to encompass the items listed thereafter and equivalents thereof as well as additional items.

What is claimed is:

1. A method of transferring charge from a photosensitive array, the method comprising:
   using a plurality of vertical shift registers, each having a plurality of vertical elements including a first vertical element and a last vertical element, wherein each of the plurality of vertical elements stores charge, wherein the plurality of vertical shift registers, when operated, transfer charge from each of the plurality of vertical elements to a respective adjacent one of the plurality of vertical elements in a first direction from the first vertical element to the last vertical element;
   using at least one horizontal shift register having a plurality of horizontal elements, each of the plurality of horizontal elements of the at least one horizontal shift register arranged to receive charge transferred from the last vertical element of a respective one of the plurality of vertical shift registers, wherein the at least one horizontal shift register, when operated, transfers charge from each of the plurality of horizontal elements to a respective adjacent one of the plurality of horizontal elements;

operating the at least one horizontal shift register during a plurality of horizontal operating intervals; and operating the plurality of vertical shift registers during at least a portion of each of the plurality of horizontal operating intervals, wherein the plurality of vertical shift registers are selectively operated in at least a first mode or in a second mode, wherein the first mode has reduced noise coupling relative to the second mode, and wherein operating the plurality of vertical shift registers comprises operating the plurality of vertical shift registers in the first mode when operating the plurality of vertical shift registers during at least the portion of each of the plurality of horizontal operating intervals.

2. The method of claim 1, wherein reducing the noise coupling comprises providing a first level of power to the vertical shift registers during the at least a portion of each of the plurality of the horizontal operating intervals, and a second level of power to the vertical shift registers during the horizontal non-operating intervals, and wherein providing the first level of power comprises using first switches smaller than second switches used when providing the second level of power.

3. The method of claim 2, wherein the first switches have lower gate voltage thresholds and/or slower turn-on times than the second switches.

4. A method of transferring charge from a photosensitive array using a plurality of vertical shift registers, each having a plurality of vertical elements including a first vertical element and a last vertical element, each of the plurality of vertical elements storing charge, the plurality of vertical shift registers, when operated, transferring charge from each of the plurality of vertical elements to a respective adjacent one of the plurality of vertical elements in a first direction from the first vertical element to the last vertical element, and using at least one horizontal shift register having a plurality of horizontal elements, each of the plurality of horizontal elements of the at least one horizontal shift register arranged to receive charge transferred from the last vertical element of a respective one of the plurality of vertical shift registers, the at least one horizontal shift register, when operated, transferring charge from each of the plurality of horizontal elements to a respective adjacent one of the plurality of horizontal elements, the method comprising:

operating the at least one horizontal shift register during a plurality of horizontal operating intervals; and operating the plurality of vertical shift registers during at least a portion of each of the plurality of horizontal operating intervals wherein the plurality of vertical shift registers are operated in a first power mode or in a second power mode, the first power mode operating at a lower power than the second power mode, and wherein operating the plurality of vertical shift registers comprises operating the plurality of vertical shift registers in the first power mode when operating the plurality of vertical shift registers during at least the portion of each of the plurality of horizontal operating intervals.

5. The method of claim 4, wherein operating the plurality of vertical shift registers includes operating the plurality of vertical shift registers in the first power mode throughout each of the plurality of horizontal operating intervals.

6. The method of claim 5, further comprising stopping the operation of the at least one horizontal shift register during a plurality of horizontal non-operating intervals, each of the plurality of horizontal non-operating intervals following a respective one of the plurality of horizontal operating intervals.

7. The method of claim 6, wherein operating the plurality of vertical shift registers includes operating the plurality of vertical shift registers in the second power mode during at least a portion of the horizontal non-operating intervals.

8. The method of claim 7, wherein operating the plurality of vertical shift registers in the second power mode during at least the portion of the plurality of horizontal non-operating intervals includes operating the plurality of vertical shift registers in the second power mode substantially throughout each of the plurality of horizontal non-operating intervals.

9. The method of claim 7, wherein the plurality of vertical registers transfer charge to the respective adjacent elements in a plurality of phases, each of the plurality of phases requiring at least one clock cycle of at least one vertical clock, and wherein operating the plurality of vertical shift registers includes operating the plurality of vertical shift registers such that at least one of the plurality of phases is completed in the first power mode during each of the horizontal operating intervals.

10. The method of claim 9, wherein operating the plurality of vertical shift registers includes operating the plurality of vertical shift registers such that a remainder of the plurality of phases not completed during a respective horizontal operating interval are completed in the second power mode during a following non-operating interval.

11. The method of claim 4, further comprising providing an attracting potential and/or a repelling potential to facilitate transferring charge between the plurality of elements in the plurality of vertical shift registers by selectively providing at least a first voltage level and a second voltage level to operate as the attracting and/or repelling potential, the first voltage level being smaller than the second voltage level, wherein selectively providing at least the first voltage and the second voltage includes selecting the first voltage level when operating the plurality of vertical shift registers in the first power mode and selecting the second voltage level when operating the plurality of vertical shift registers in the second power mode.

12. The method of claim 11, wherein the at least the first voltage and the second voltage are each provided through at least one switch, the method further comprising selecting between at least a first turn-on speed and a second turn-on speed for the at least one switch, the first turn-on speed being slower than the second turn-on speed, wherein selecting between the at least the first turn-on speed and the second turn-on speed includes selecting the first turn-on speed when operating the plurality of vertical drivers in the first power mode and selecting the second turn-on speed when operating the plurality of vertical drivers in the second power mode.

13. A circuit for transferring charge from a photosensitive array, the circuit comprising:

a plurality of vertical shift registers, each of the plurality of vertical shift registers including a plurality of vertical elements including a first vertical element and a last vertical element, each of the plurality of vertical elements being adapted to store charge, wherein each of the plurality of vertical shift registers, when operated, is adapted to transfer charge from each of the plurality of vertical elements to a respective adjacent one of the plurality of vertical elements in a direction from the respective first vertical element to the respective last vertical element, wherein the plurality of vertical shift registers are adapted to have at least two modes of operation comprising a first mode and a second mode, wherein the first mode has reduced noise coupling relative to the second mode;

at least one horizontal shift register having a plurality of horizontal elements, each being adapted to store charge, the at least one horizontal shift register arranged to receive charge transferred out of the plurality of vertical shift registers by arranging each of the plurality of horizontal elements of the at least one horizontal shift register to receive charge from a respective last vertical element of the plurality of vertical shift registers, wherein the at least one horizontal shift register, when operated, is adapted to transfer charge from each of the plurality of horizontal elements to a respective adjacent one of the plurality of horizontal elements; and at least one controller adapted to control timing of operating the plurality of vertical shift registers and the at least one horizontal shift register, wherein the at least one controller is adapted to operate the at least one horizontal shift register during a plurality of horizontal operating intervals, the at least one controller further adapted to operate the plurality of vertical shift registers during at least a portion of each of the plurality of horizontal operating intervals in the first mode when operating the plurality of vertical shift registers during at least the portion of each of the plurality of horizontal operating intervals.

14. The circuit of claim 13, further comprising at least one vertical clock coupled to the plurality of vertical shift registers to operate, at least in part, the plurality of vertical shift registers, wherein the plurality of vertical registers transfer charge from each of the plurality vertical elements to the respective adjacent vertical elements in a plurality of phases, each of the plurality of phases requiring at least one clock cycle of the at least one vertical clock, and wherein the at least one controller operates the plurality of vertical shift registers such that at least one of the plurality of phases is completed during each of the horizontal operating intervals.

15. The circuit of claim 14, wherein the at least one controller operates the plurality of vertical shift registers such that a remainder of the plurality of phases not completed in a given horizontal operating interval is completed in the second power mode in a following horizontal non-operating interval.

16. The circuit of claim 13, wherein the at least one controller reduces the noise coupling by providing a first level of power to the vertical shift registers during the at least a portion of each of the plurality of the horizontal operating intervals, and a second level of power to the vertical shift registers during the horizontal non-operating intervals, and
wherein the at least one controller provides the first level of power, using first switches smaller than second switches used when providing the second level of power.

17. The method of claim 16, wherein the first switches have lower gate voltage thresholds and/or slower turn-on times than the second switches.

18. A circuit for transferring charge from a photosensitive array, the circuit comprising:

a plurality of vertical shift registers, each of the plurality of vertical shift registers including a plurality of vertical elements including a first vertical element and a last vertical element, each of the plurality of vertical elements being adapted to store charge, wherein each of the plurality of vertical shift registers, when operated, is arranged to transfer charge from each of the plurality of vertical elements to a respective adjacent one of the plurality of vertical elements in a direction from the respective first vertical element to the respective last vertical element;

at least one horizontal shift register having a plurality of horizontal elements, each being adapted to store charge, the at least one horizontal shift register arranged to receive charge transferred out of the plurality of vertical shift registers by arranging each of the plurality of horizontal elements of the at least one horizontal shift register to receive charge from a respective last vertical element of the plurality of vertical shift registers, wherein the at least one horizontal shift register, when operated, is arranged to transfer charge from each of the plurality of horizontal elements to a respective adjacent one of the plurality of horizontal elements; and at least one controller for controlling timing of operating the plurality of vertical shift registers and the at least one horizontal shift register, wherein the at least one controller operates the at least one horizontal shift register during a plurality of horizontal operating intervals, the at least one controller further operates the plurality of vertical shift registers during at least a portion of each of the plurality of horizontal operating intervals, wherein the at least one controller operates the plurality of vertical shift registers in a first power mode or a second power mode, the first power mode operating at a lower power than the second operating mode, and wherein the at least one controller operates the plurality of vertical shift registers in the first power mode when operating the plurality of vertical shift registers during at least the portion of each of the plurality of horizontal operating intervals.

19. The circuit of claim 18, wherein the at least one controller operates the plurality of vertical shift registers in the first power mode substantially throughout each of the plurality of horizontal operating intervals.

20. The circuit of claim 18, wherein the at least one controller stops the operation of the at least one horizontal shift register during a plurality of horizontal non-operating intervals, each of the plurality of horizontal non-operating intervals following a respective one of the plurality of horizontal operating intervals.

21. The circuit of claim 20, wherein the at least one controller operates the plurality of vertical shift registers in the second power mode at least during a portion of each of the plurality of horizontal non-operating intervals.

22. The circuit of claim 21, wherein the at least one controller operates the plurality of vertical shift registers in the second power mode substantially throughout the plurality of horizontal non-operating intervals.

23. The circuit of claim 20, wherein the at least one controller operates the plurality of vertical shift registers in the second power mode during at least a portion of each of the horizontal non-operating intervals.

24. The circuit of claim 23, wherein the at least one controller operates the plurality of vertical shift registers in the second power mode substantially throughout each of the horizontal non-operating intervals.

25. The circuit of claim 23, wherein the at least one controller includes a plurality of vertical driver elements for providing an attracting potential and/or a repelling potential to facilitate transferring charge between the plurality of vertical elements in the plurality of vertical shift registers, each of the vertical driver elements selectively providing at least a first voltage level or a second voltage level to operate as the attracting and/or repelling potential, the first voltage level being smaller than the second voltage level, and wherein the controller controls each of the vertical driver elements to provide the first voltage level when operating the plurality of vertical shift registers in the first power mode and to control each of the vertical driver elements to provide the second voltage level when operating the plurality of vertical shift registers in the second power mode.

26. The circuit of claim 25, wherein the each of the vertical driver elements comprises at least one switch for each of the first voltage level and the second voltage level, the at least one switch being controlled to provide the respective voltage level at an output of respective vertical driver elements, and wherein the vertical driver element further comprises a turn-on time control circuit for controlling a speed at which each respective at least one switch is turned on.

27. The circuit of claim 26, wherein each of the turn-on time control circuits is arranged to select between at least a first speed and a second speed, the first speed being slower than the second speed, and wherein each of the turn-on time control circuits selects the first speed when the plurality of vertical drivers is operated in the first power mode and selects the second speed when the plurality of vertical drivers is operated in the second power mode.

* * * * *